United States Patent [19]

Wood, Jr.

[11] Patent Number: 4,725,159
[45] Date of Patent: Feb. 16, 1988

[54] BEARING FOR A JOINT
[75] Inventor: Ruey E. Wood, Jr., St. Clair Shores, Mich.
[73] Assignee: TRW Inc., Lyndhurst, Ohio
[21] Appl. No.: 886,232
[22] Filed: Jul. 16, 1986
[51] Int. Cl.⁴ .............................................. F16C 11/00
[52] U.S. Cl. ................................. 403/133; 403/135; 403/143; 403/404
[58] Field of Search ............... 403/135, 143, 137, 132, 403/133, 134, 404

[56] References Cited
U.S. PATENT DOCUMENTS

| 1,868,818 | 7/1932 | Eksergian. | |
|---|---|---|---|
| 2,305,881 | 12/1942 | Leighton. | |
| 2,471,672 | 5/1940 | Booth | 403/132 |
| 3,058,765 | 10/1962 | Thomas. | |
| 3,482,487 | 12/1960 | Leffers | 403/135 X |
| 3,486,778 | 12/1969 | Herbenar et al. | |
| 3,820,908 | 6/1974 | Maxeiner et al. | |
| 3,843,272 | 10/1974 | Jorn. | |
| 3,950,006 | 4/1976 | Wood, Jr. | |
| 4,427,310 | 1/1984 | Middleton | 403/143 X |
| 4,435,097 | 3/1984 | Peterson. | |
| 4,507,011 | 3/1985 | Brown | 403/404 |
| 4,577,988 | 3/1986 | Gollub et al. | 403/135 |

FOREIGN PATENT DOCUMENTS

| 1260144 | 1/1972 | United Kingdom | 403/135 |
|---|---|---|---|
| 1525338 | 9/1978 | United Kingdom | 403/135 |

Primary Examiner—Randolph A. Reese
Assistant Examiner—Peter M. Cuomo
Attorney, Agent, or Firm—Tarolli, Sundheim & Covell

[57] ABSTRACT

A joint includes a stud, a socket, and an elastomeric bearing disposed between the stud and the socket. The stud includes a head portion and a shank portion extending from the head portion. The socket has a surface defining a chamber in which the head portion is disposed. The socket also has an opening through which the shank portion extends. The elastomeric bearing has a first portion and a second portion of a higher durometer than the first portion. The second portion is integrally formed with the first portion.

8 Claims, 4 Drawing Figures

BEARING FOR A JOINT

BACKGROUND OF THE INVENTION

The present invention relates to a joint and more specifically to a joint having relatively movable parts and an elastomeric bearing disposed between the parts.

Joints having relatively movable parts and a bearing therebetween are known. The bearing carries the load transmitted between the parts. The joint may be used in an application where the load tending to move the parts in a first relative direction can be relatively large while the load tending to move the parts in a second relative direction can be relatively small. Bearings have been developed to handle the load variation described above.

Specifically, a known bearing made of two separate pieces is disposed between the parts. One piece of the bearing, made of a relatively hard material such as nylon, is disposed between the parts and carries the load acting in the first direction of relative movement of the parts. The other piece of the bearing, made of a relatively resilient rubber-like material, is disposed between the parts and transmits the loads in the second direction of relative movement of the parts. Such a bearing is disclosed in copending Application Ser. No. 815,675, filed Jan. 2, 1986 which is a continuation of Application Ser. No. 726,135, filed Apr. 23, 1985, now abandoned, and is assigned to the assignee of the present application and in U.S. Pat. No. 3,486,778.

Also, joints having relatively movable parts and an elastomeric bearing therebetween are known. U.S. Pat. No. 3,843,272 is one example. To applicant's knowledge, a joint having a totally elastomeric bearing constructed to handle the load variation described above is not known.

SUMMARY OF THE INVENTION

The present invention is a joint having relatively movable parts and a novel one-piece elastomeric bearing therebetween. The elastomeric bearing has two portions each with a different durometer hardness. One portion is relatively hard and the other portion is relatively soft. The relatively hard portion is located to transmit the relatively large loads between the parts. The relatively soft portion transmits the relatively small loads between the parts.

In one embodiment, the two portions of the bearing are molded as one piece with a transition zone between the hard and soft portions. This transition zone prevents a build up of stresses at the junction between the hard and soft portions. In another embodiment of the invention, the hard and soft portions are separated by a force transmitting retainer which is engaged by one of the parts of the joint after a predetermined amount of relative movement of the parts so that the parts can move relatively rather easily for a predetermined amount of relative movement and thereafter their relative movement is resisted by a greater force.

BRIEF DESCRIPTION OF THE DRAWINGS

Further features of the present invention will become apparent to those skilled in the art to which the present invention relates from a reading of the following specification made with reference to the accompanying drawings, in which.

DESCRIPTION OF PREFERRED EMBODIMENTS

Figure 1:
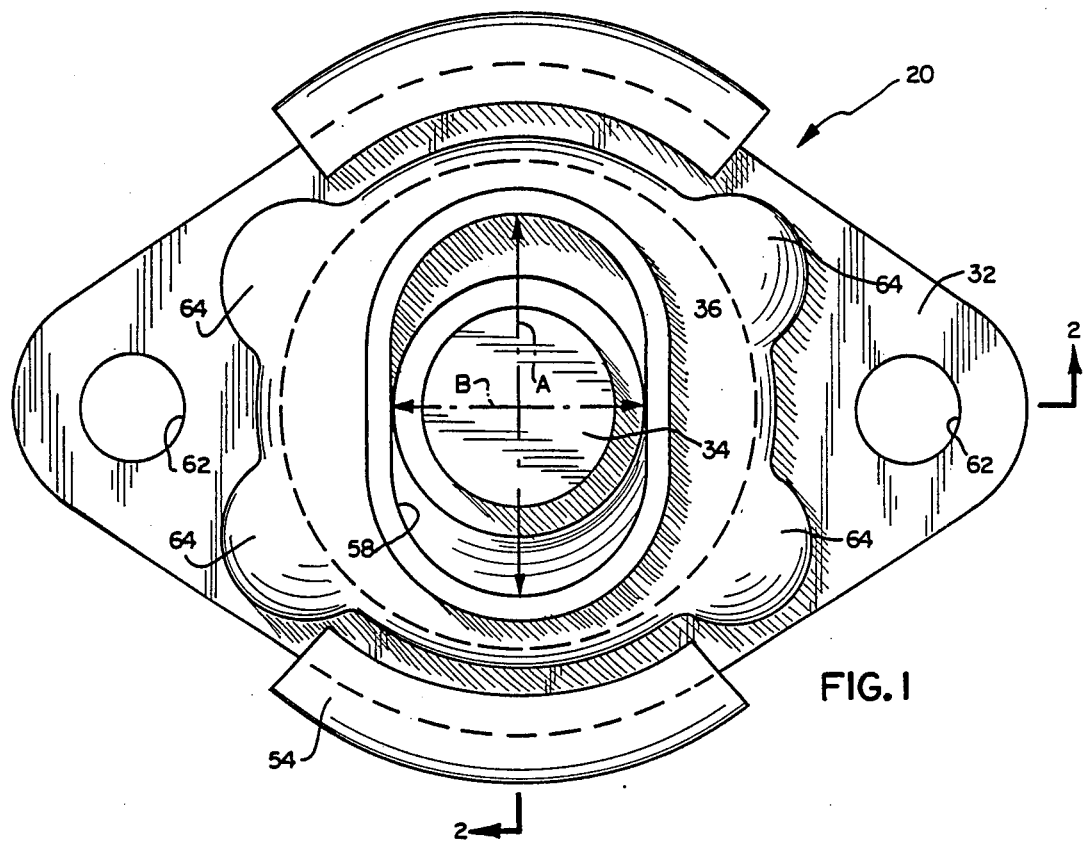
FIG. 1 is a top view illustrating a joint made in accordance with the present invention.
Figure 2:
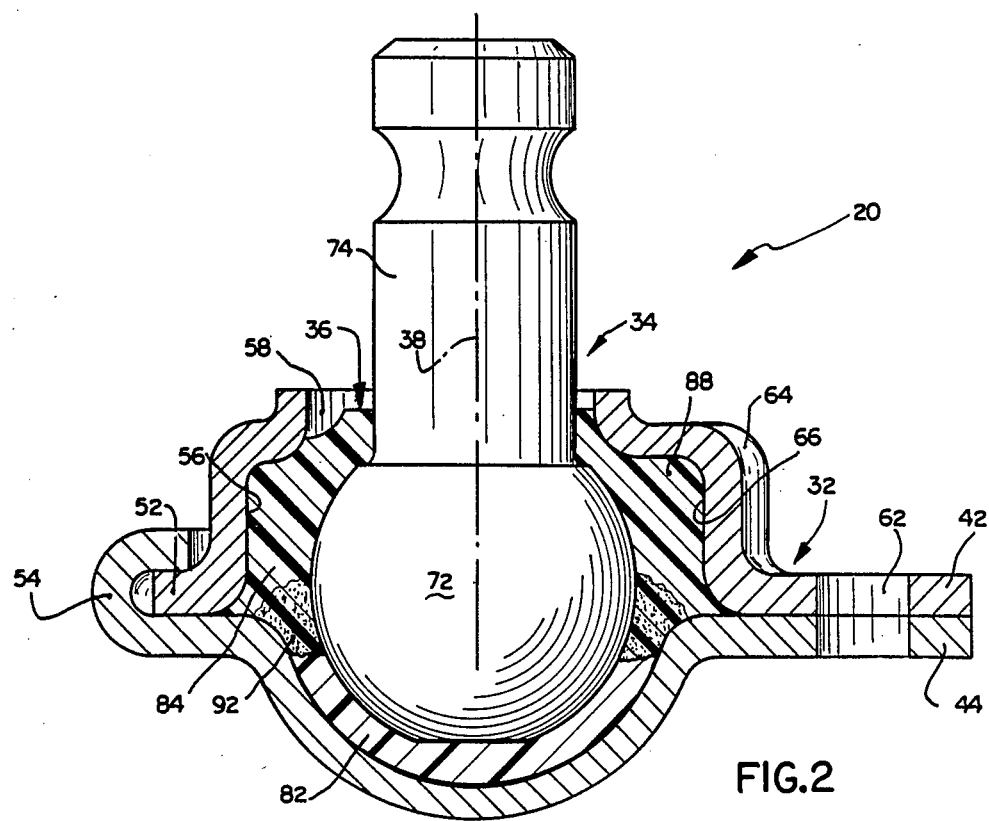
FIG. 2 is a view of the joint in FIG. 1, taken approximately along the line 2—2 of FIG. 1.

The present invention provides a joint having relatively movable parts in the form of a stud and a socket. An elastomeric bearing is disposed between the stud and socket. Joints having relatively movable parts are used in various automotive steering and suspension applications. FIGS. 1 and 2 illustrate a vehicle steering linkage joint 20 embodying the present invention.

The joint 20 includes a socket 32, a stud 34, and a one-piece elastomeric bearing 36 (FIG. 2). The socket 32 is connectable with one part (not shown) of the vehicle steering linkage. The stud 34 is connectable with another part of the vehicle steering linkage (not shown). The stud 34 is pivotal relative to the socket 32 and is rotatable about its longitudinal axis 38 relative to the socket 32.

The socket 32 includes an upper half 42 and a lower half 44. The upper half 42 and the lower half 44 are stamped from steel. The upper half 44 has a flange 52. The lower half 44 has an edge portion 54 crimped over the flange 52 to connect the halves together. The socket 32 nas a generally spherical inner surface defining a chamber 56.

The socket 32 has an elongated opening 58 (FIG. 1). The elongated opening 58 has a length represented by the dimension A and a width represented by the dimension B. The dimension A is greater than the dimension B. The socket 32 also has a pair of openings 62. Fasteners, such as bolts or rivets (not shown) extend through the openings 62 in order to connect the socket 32 with a part of the vehicle steering linkage. The socket 32 also has projections 64 extending from the upper half 42. Four projections 64 extend from the upper half 42 as shown in FIG. 1. The projections have interior surfaces which define volumes 66 (FIG. 2), the purpose of which will be described below.

The stud 34 includes a head portion 72 and a shank portion 74 extending from the head portion. The stud 34 is made of metal by a known process, such as forging or powdered metallurgy techniques. The head portion 72 has a generally spherical configuration and is disposed in the chamber 56. While the head portion 72 is illustrated as being spherical, it will be obvious that the head portion may have various configurations, as is known in the art. The shank portion 74 extends through the elongated opening 58. The dimension B (FIG. 1) of the opening 58 is slightly greater than the diameter of the shank portion 74. The dimension A of the opening 58 is substantiallY greater than the diameter of the shank portion 74. Tnerefore, the stud 34 is constrained to oscillate relative to the socket 32 in a path along the dimension A of the elongated opening 58. The stud 34 can also rotate about its longitudinal axis 38 (FIG. 2) relative to the socket 32.

The one-piece elastomeric bearing 36 is disposed between the stud 34 and socket 32. The bearing 36 resiliently interconnects the stud 34 and socket 32 and transmits loads therebetween. The elastomeric bearing 36 encapsulates and is bonded to the head portion 72 of the stud 34, as is known. The elastomeric bearing 36 fills the chamber 56 of the socket 32.

The elastomeric bearing 36 is integrally formed from two elastomeric materials which form two portions 82, 84 of the elastomeric bearing. The first portion 82 of the elastomeric bearing 36 is integrally formed with second portion 84 by molding the first and second portions 82, 84 simultaneously around the stud 34 in a mold cavity. The first portion 82 is selected from a material which has a relatively high durometer hardness in the range of 60-90 points. Thus, the first portion 82 is relatively hard and nonresilient, and is suitable for transmitting relatively high loads. The first portion 82 transmits load forces between the stud 34 and socket 32 which are applied generally axially of the stud 34.

The first portion 82 is disposed in the area of highest loading between the stud 34 and socket 32. Specifically, the joint 20 is subjected to relatively high loading applied generally axially of the stud 34, and the first portion 82 is disposed diametrically opposite the shank portion 74 of the stud 34.

The second portion 84 of the elastomeric bearing 36 is softer and more resilient than the first portion 82. When a load is applied to the stud 34 pivoting it from an initial position relative to the socket 32, the second portion 84 develops internal forces resisting the relative pivotal movement. The internal forces urge the stud 34 and socket 32 to return to the initial relative position when the load causing the pivotal movement of the stud is removed. Also, upon rotation of the stud 34 about its longitudinal axis 38, internal forces are developed in the second portion 84 which resist rotation. Thus, the stud 34 is urged to return to the initial position relative to the socket 32 by the internal resilient forces in the second portion 84. The second portion 84 is a resilient elastomeric material having a relatively low durometer hardness in the range of 40 to 70 points. The durometer hardness of the second portion is less than the durometer hardness of the first portion by 15 to 25 points.

The elastomeric bearing has projections 88 which extend into the volumes 66 defined by the socket 32. These projections 88 mechanically interlock the elastomeric bearing 36 with the socket 32 to prevent slippage of the elastomeric bearing 36 relative to the socket 32. These projections preferably are also of a high durometer hardness elastomeric material similar to that of the first portion 82.

The elastomeric bearing 36 also includes a transition band 92. The transition band 92 has materials of the first portion 82 and the second portion 84 intermixed during the molding operation. The transition band 92 prevents a build up of stress that might result at a discrete parting line of the two bearing materials.

Figure 3:
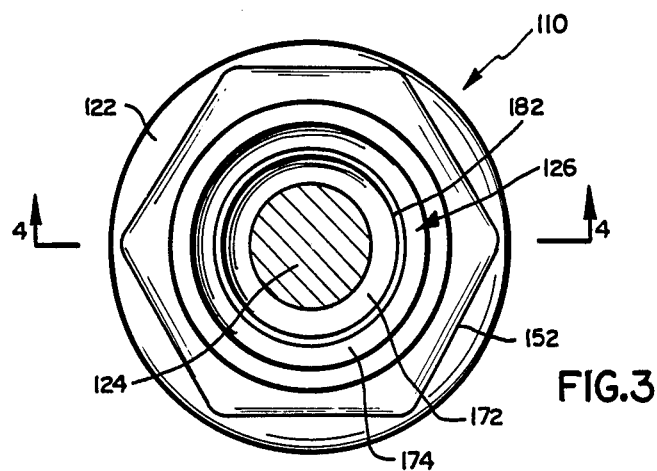
FIG. 3 is a side view illustrating another joint made in accordance with the present invention.
Figure 4:
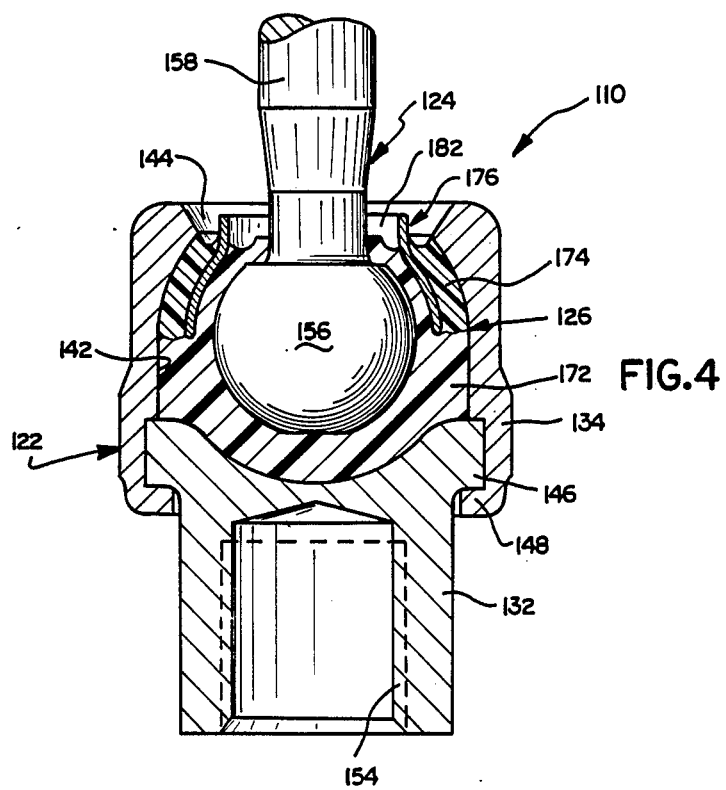
FIG. 4 is a cross sectional view of the joint of FIG. 3, taken approximately along the line 4—4 of FIG. 3.

A second embodiment of the present invention designated as a joint 110 is illustrated in FIGS. 3 and 4. The joint 110 is typically used as an inner tie rod end in an automotive rack and pinion steering linkage. The joint 110 (FIG. 4) includes a socket 122, a stud 124, and means 126 for resisting relative pivotal movement of the stud and socket with a first resistance and then a second resistance.

The socket 122 has two parts, namely, a rack bar connector 132 and a socket housing 134. The socket housing 134 has an inner surface defining a chamber 142. The socket housing 134 also has a circular opening 144. The rack connector 132 has a flange 146. An end portion 148 of the socket housing 134 is deformed over the flange 146 during assembly to connect the rack bar connector 132 with the socket housing 134. The socket housing 134 has a hex portion 152 (FIG. 3) engageable by a suitable tool for tightening rack bar connector threads 154 to a rack bar (not shown).

The stud 124 (FIG. 4) includes a head portion 156 and a shank portion 158 extending from the head portion. The head portion 156 has a generally spherical configuration. It will be obvious that the head portion 156 may be of other configurations, as is known. The head portion 156 is disposed within the chamber 142. The shank portion 158 extends through the opening 144 in the socket housing 132.

The means 126 for resisting relative pivotal movement of the stud 124 and socket 132 with a first resistance and then a second resistance includes an elastomeric bearing. The elastomeric bearing 126 is disposed between the socket 122 and stud 124. The elastomeric bearing 126 may be molded in place in the socket 122. The bearing 126 may also be molded in a separate operation and then assembled between the socket 122 and stud 124. The bearing 126 includes a first portion or layer of elastomeric material 172, a second portion or layer of elastomeric material 174, and a retainer 176. The first layer 172 and second layer 174 are integrally molded as one piece with the retainer 176.

The first layer 172 resists relative pivotal movement of the stud 124 and socket 122 for a first range of relative movement thereof. The first layer 172 exerts the first resistance urging the stud 124 and socket 122 to an initial relative position upon movement therefrom. The first layer 172 encapsulates the head portion 156 of the stud 124 and is bonded thereto. The first layer 172 also engages the surface defining a part of the chamber 142. The first layer 172 is made from a relatively resilient elastomeric material having a durometer hardness in the range of 40 to 70 points.

When a force pivots the stud 124 from an initial position relative to the socket 122, internal stresses are created in the first layer 172. These internal stresses resist movement of the stud 124 from the initial position with a first resistance as long as the force causing the pivotal movement is applied.

The second layer 174 resists pivotal movement of the stud 124 relative to the socket 122 beyond a predetermined amount with a second resistance. The second resistance is the resistance obtained from the first layer 172 plus the resistance added due to the second layer 174. The second resistance is greater than the first resistance. The second layer 174 is made of a relatively hard elastomeric material having a durometer hardness in the range of 60 to 90 points. The durometer hardness of the second layer 174 is preferably maintained in a range of 15 to 25 points greater than the durometer hardness of the first layer 172. The second layer 174 is disposed radially outward of the first layer 172, between the first layer and the socket housing 134. The second layer 174 extends continuously around the inner surface of the chamber 142 adjacent the opening 144.

A retainer 176 transmits relative pivotal movement of the stud 124 to the second layer 174. The retainer 176 is disposed between the first layer 172 and the second layer 174. The retainer 176 is made of a relatively rigid material, such as metal, and is bonded to the first layer 172 and second layer 174. The retainer 176 has a portion 182 which extends from the elastomeric bearing 126 into the opening 144. The elastomeric bearing 126 is constructed so that the portion 182 of the retainer 176 is engaged by the shank portion 158 of the stud 124 when the stud pivots a predetermined amount relative to the socket 122. Upon the predetermined amount of pivotal movement, the shank portion 158 contacts the portion 182 of the retainer 176 and transmits pivotal movement to the second layer 174. The pivotal movement is then resisted by the greater second resistance.

When the stud 124 pivots less than the predetermined amount, it does not engage the portion 182 of the retainer 176. Therefore, relative pivotal movement is resisted only by the relatively small first resistance. Upon relative pivotal movement greater than the predetermined amount, the stud 124 engages the portion 182 of the retainer 176 and transmits movement to the retainer. Movement of the retainer 176 and shank portion 158 of the stud 124 is now resisted by the greater second resistance. It is because the second layer 174 is made of a higher durometer hardness material than the first layer 172 that the stud 124 encounters the greater resistive force.

From the above description of preferred embodiments, those skilled in the art will perceive improvements, changes and modifications in the present invention, and such improvements, changes and modifications within the skill of the art are intended to be included herein and covered by the spirit and scope of the claims below.

Having described at least one preferred embodiment, I claim:

1. A joint comprising:
   a stud including a head portion and a shank portion extending therefrom;
   a socket having a surface defining a chamber in which said head portion is disposed and an opening through which said shank portion extends; and
   an elastomeric bearing disposed between said head portion and said socket and bonded to said head portion, said elastomeric bearing having a resilient portion and another portion of a higher durometer hardness than said resilient portion integrally formed as one piece with said resilient portion.

2. A joint as set forth in claim 1 wherein said another portion is disposed opposite said shank portion of said stud for transmitting forces between said stud and said socket.

3. A joint as set forth in claim 1 wherein said another portion is disposed between said resilient portion and said socket adjacent said opening for resisting pivotal movement of said stud relative to said socket upon a predetermined amount of relative pivotal movement therebetween, and further including a retainer disposed between said resilient portion and said another portion, said retainer having a portion engageable by said shank portion of said stud upon the predetermined amount of relative movement of said stud and socket for transmitting movement to said another portion of said elastomeric bearing.

4. A joint comprising:
   a stud including a head portion and a shank portion extending therefrom;
   a socket having a surface defining a chamber in which said head portion is disposed and an opening through which said shank portion extends; and
   an elastomeric bearing disposed between said head portion and said socket, said elastomeric bearing having a first portion for transmitting load forces between said head portion and said socket and a second portion integrally formed as one piece with said first portion and having a lower durometer hardness than said first portion for resiliently interconnecting said head portion with said socket and resisting rotation of said stud about its longitudinal axis relative to said socket, said first portion and said second portion being joined in a transition band having the material of said first portion intermixed with the material of said second portion.

5. A joint as set forth in claim 4 wherein said elastomeric bearing is bonded to said socket to resist slippage therebetween.

6. A joint as set forth in claim 4 wherein said first portion of said elastomeric bearing is made of one elastomeric material and said second portion of said elastomeric bearing is made of another elastomeric material.

7. A joint comprising:
   a stud including a head portion and a shank portion extending therefrom;
   a socket having a surface defining a chamber in which said head portion is disposed and an opening through which said shank portion extends; and
   an elastomeric bearing disposed between said head portion and said socket, said elastomeric bearing having a first portion for transmitting load forces between said head portion and said socket and a second portion integrally formed as one piece with said first portion and having a lower durometer hardness than said first portion for resiliently interconnecting said head portion with said socket and resisting rotation of said stud about its longitudinal axis relative to said socket, said elastomeric bearing encapsulating said head portion and being bonded to said head portion to resist slippage therebetween.

8. A joint as set forth in claim 7 wherein said second portion includes at least one projection extending therefrom and into a volume defined by said surface of said chamber to mechanically interlock said second portion with said socket to resist slippage therebetween.

* * * * *